United States Patent
Salem et al.

(10) Patent No.: US 9,070,203 B2
(45) Date of Patent: Jun. 30, 2015

(54) IDENTIFICATION AND QUANTIFICATION OF MICROTEXTURED REGIONS IN MATERIALS WITH ORDERED CRYSTAL STRUCTURE

(71) Applicant: MRL MATERIALS RESOURCES LLC, Dayton, OH (US)

(72) Inventors: Ayman A. Salem, Beavercreek, OH (US); Joshua B. Shaffer, Fairborn, OH (US)

(73) Assignee: MRL MATERIALS RESOURCES LLC, Dayton, OH (US)

( * ) Notice: Subject to any disclaimer, the term of this patent is extended or adjusted under 35 U.S.C. 154(b) by 267 days.

(21) Appl. No.: 13/761,912

(22) Filed: Feb. 7, 2013

(65) Prior Publication Data

US 2013/0208951 A1 Aug. 15, 2013

Related U.S. Application Data

(60) Provisional application No. 61/596,703, filed on Feb. 8, 2012.

(51) Int. Cl.
*G06K 9/00* (2006.01)
*G06T 7/40* (2006.01)
*G06T 7/00* (2006.01)

(52) U.S. Cl.
CPC ............... *G06T 7/40* (2013.01); *G06T 7/0081* (2013.01)

(58) Field of Classification Search
CPC ........................................................ G06T 7/40
USPC ........................................................ 382/108
See application file for complete search history.

(56) References Cited

U.S. PATENT DOCUMENTS

| 5,592,598 A * | 1/1997 | Yamrom ................. 345/423 |
| 6,577,970 B2 | 6/2003 | Houge et al. |
| 2001/0031920 A1* | 10/2001 | Kaufman et al. ......... 600/431 |
| 2007/0147685 A1* | 6/2007 | Ericson .................. 382/225 |

(Continued)

FOREIGN PATENT DOCUMENTS

WO 2012112898 A1 8/2012

OTHER PUBLICATIONS

Review Microtexture Determination by Electron Back-Scatter Diffraction. 1992. DJ Dingley and V. Rangle.*

(Continued)

*Primary Examiner* — Stephen R Koziol
*Assistant Examiner* — Delomia Gilliard
(74) *Attorney, Agent, or Firm* — Thomas E. Lees, LLC (57) ABSTRACT

The identification and quantification of microtextured regions in orientation datasets is provided through the use of microstructure informatics based on n-point correlation functions, dimensionality reduction techniques, and a computer algebra system. Orientation information is extracted for materials and processing is performed on the orientation information along with other ancillary data that accompanies each piece of orientation information and a hybrid descriptor of orientation is formed. Representative descriptors are identified such that regions of microtexture are classified. This classification is mapped back onto the real space of the sample and a local clustering is done to identify continuous regions of microtexture. These labeled continuous regions of microtexture then provide a method for segmentation of the orientation data into their respective macrozones.

21 Claims, 7 Drawing Sheets

(56) References Cited

U.S. PATENT DOCUMENTS

2008/0215314 A1* 9/2008 Spangler .................. 704/10
2010/0217537 A1* 8/2010 Neiss et al. .................. 702/28

OTHER PUBLICATIONS

Expressing Crystallographic Textures through the Orientation Distribution Function. 2009. JK Mason and CA Schuh.*
Present State of Electron Backscatter Diffraction and Prospective Developments. 2008. R. A. Schwarzer, D. P. Field, B. L. Adams, M. Kumar, A. J. Schwartz.*
The n-point orientation correlation function and its application. 2004. Mojia Huang.*
Glavicic, M.G. et al., "A method to determine the orientation of the high-temperature beta phase from measured EBSD data for the low-temperature alpha phase in Ti-6Al-4V", Materials Science and Engineering, A346 (2003), pp. 50-59.
Glavicic, M.G. et al., "An automated method to determine the orientation of the high-temperature beta phase from measured EBSD data for the low-temperature alpha-phase in Ti-6Al-4V", Materials Science and Engineering, A351 (2003), pp. 258-264.
D. J. Dingley and V. Randle, "Review, Microtexture Determination by Electron Back-Scatter Diffraction", Journal of Materials Science 27, 1992, pp. 4545-4566.
Lotfi Toubal, Philippe Bocher, Andre Moreau and Daniel Levesque, "Macroregion Size Measurements in Bimodal Titanium Forgings Using Two-Dimensional Autocorrelation Method", Metallurgical and Materials Transactions A, vol. 41, Mar. 2010, pp. 744-750.
Surya R. Kalidindi, Stephen R. Niezgoda and Ayman A. Salem, "Microstructure Informatics Using Higher-Order Statistics and Efficient Data-Mining Protocols", JOM, vol. 63, Issue 4, Apr. 2011, pp. 34-41.
E. Uta, N. Gey, P. Bocher, M. Humbert & J. Gilgert, "Texture Heterogeneities in alphap/alphas Titanium Forging Analysed by EBSD-Relation to Fatigue Crack Propagation", Journal of Microscopy, vol. 233, Mar. 2009, pp. 451-459.
R. Smith, S. Sharples, W. Li, M. Clark and M. Somekh, "Orientation Imaging Using Spatially Resolved Acoustic Spectroscopy", Journal of Physics: Conference Series 353 (2012) 012003.
Stuart I. Wright, Brent L. Adams and Karsten Kunze, "Application of a New Automatic Lattice Orientation Measurement Technique to Polycrystalline Aluminum", Materials Science and Engineering, A160, 1993, pp. 229-240.
B. L. Adams, S. R. Kalidindi and D. Fullwood, "Microstructure Sensitive Design for Performance Optimization", Butterworth-Heinemann, Sep. 25, 2012, pp. 118-155.
Valerie Randle and Olaf Engler, "Introduction to Texture Analysis, Macrotexture, Microtexture and Orientation Mapping", CRC Press, 2010, pp. 18 and 291.

* cited by examiner

IDENTIFICATION AND QUANTIFICATION OF MICROTEXTURED REGIONS IN MATERIALS WITH ORDERED CRYSTAL STRUCTURE

CROSS REFERENCE TO RELATED APPLICATIONS

This application claims the benefit of U.S. Provisional Patent Application Ser. No. 61/596,703, filed Feb. 8, 2012, the disclosure of which is hereby incorporated by reference in its entirety.

BACKGROUND

The present disclosure relates to the analysis of materials, and in particular to the identification and quantification of microtextured regions (i.e., macrozones) in materials with ordered crystal structures.

Materials science deals with the fundamental properties and characteristics of materials. For instance, the field of materials science often attempts to explore the relationship between the structure of materials at atomic or molecular scales, as well as the macroscopic properties of such materials. By studying how different processes affect materials, and by studying how such materials perform under different conditions, an understanding of the limitations and capabilities of materials can be identified and predicted.

BRIEF SUMMARY

According to aspects of the present disclosure, microtextured regions in materials with ordered crystal structure are analyzed. The analysis comprises obtaining crystallographic orientation information from a sample of a material under evaluation and performing texture processing of the collected orientation information by generating hybrid descriptors, each hybrid descriptor comprising texture information and non-texture information extracted from associated orientation information. The analysis further comprises clustering the hybrid descriptors to produce orientation clusters where each orientation cluster corresponds to a dominant zone of microtexture. The method still further comprises generating composite data by spatially resolving the orientation clusters to real space and performing a local spatial filtering of the composite data such that continuous regions of similar zones of microtexture are identified in the filtered composite data.

In the following detailed description, reference is made to the accompanying drawings, which form a part hereof, and in which is shown by way of illustration, and not by way of limitation, specific embodiments in which the disclosure may be practiced. It is to be understood that other embodiments may be utilized and that changes may be made without departing from the spirit and scope of the present disclosure.

DETAILED DESCRIPTION

According to various aspects of the present disclosure, the analysis (e.g., the quantification, identification or both the quantification and identification) of microtextured regions (also referred to herein as macrozones) in materials with ordered crystal structure is carried out according to one or more approaches set out herein.

In general, an approach to analyzing microtextured regions described more fully herein is to collect a plurality of individual measurements of orientation information (in real space, i.e., spatial location on the sample) from a sample under evaluation using an orientation measurement device. The measurements are logically organized into a plurality of "tiles" such that each tile includes a number of measurements. Thus conceptually, each measurement can be represented as a "pixel" in a corresponding tile. Each measurement (in whatever form is provided by the particular orientation measurement technology) is mapped to a structure that allows subsequent processing, referred to herein generally for sake of discussion as an "orientation matrix". Thus, there is an orientation matrix for each pixel of each tile.

For every tile, the Generalized Spherical Harmonic (GSH) expansion is computed from the corresponding orientation matrices, which transforms the measurements to an "orientation space". This process is repeated for each tile individually, thus providing an efficient additive process. This process is generally referred to as "texture processing". Once the GSH coefficients are calculated, a clustering process is performed in the orientation space to produce orientation clusters and the results of the clustering process (orientation clusters) are mapped back to their respective locations in the real space. Additionally, clustering process may comprise color coding, filtering and performing other cleanup processes as described more fully herein.

Figure 1:
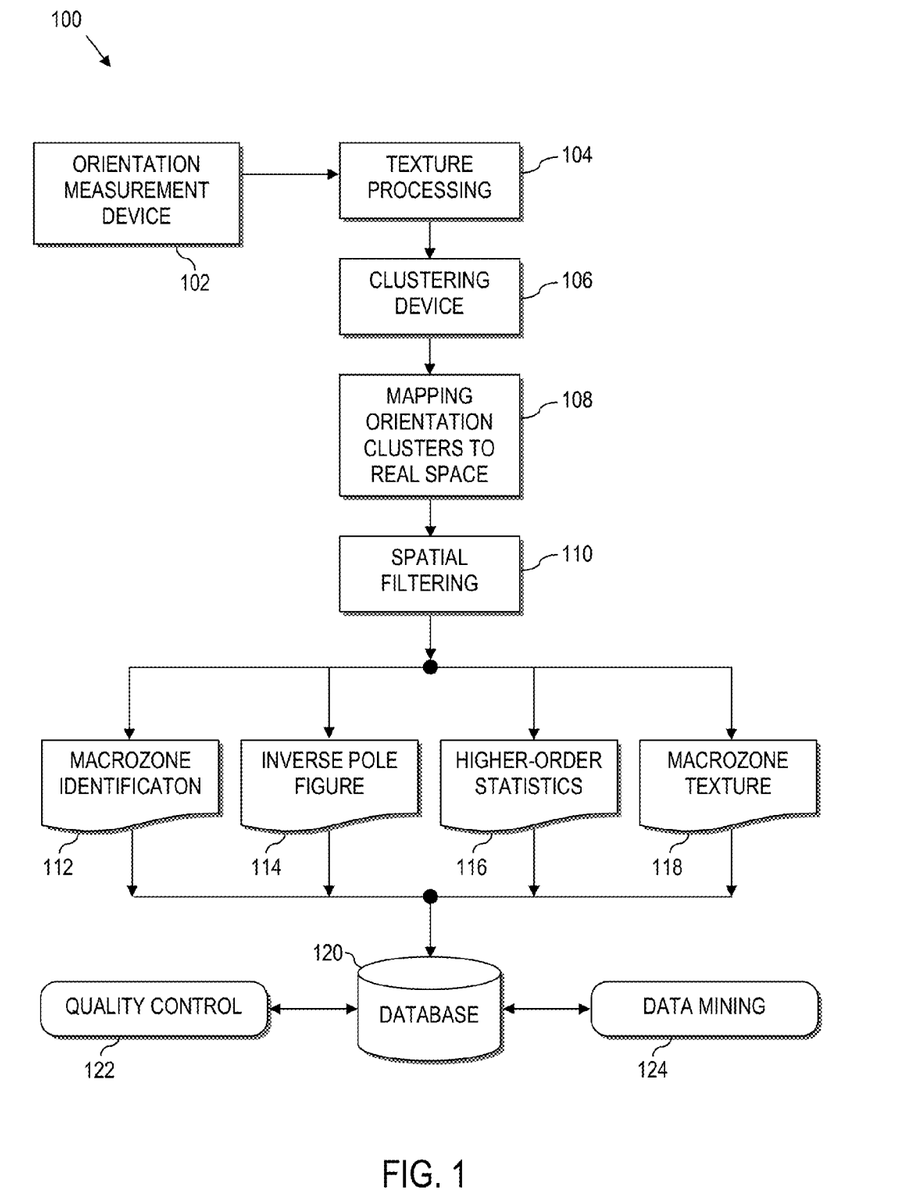
FIG. 1 is a flow chart illustrating a process for quantifying and/or identifying microtextured regions in materials with an ordered crystal structure, according to aspects of the present disclosure.

Overall Flow Diagram:

Referring now to the drawings, and particularly to FIG. 1, a flow diagram 100 illustrates a process for analyzing (e.g., identifying, quantifying, etc.) microtextured regions in materials with an ordered crystal structure, according to aspects of the present disclosure.

The process obtains crystallographic orientation information from a sample of a material under evaluation at 102. The orientation information may be derived from an existing data set, or the orientation information can be extracted from the sample under evaluation using an orientation measurement device.

For instance, where a material is available for evaluation, a sample of the material (i.e., material sample) having an ordered crystal structure is examined to collect crystallographic orientation information. As a few illustrative examples, the orientation information of the material under evaluation can be collected using an orientation measurement device that implements Electron Backscatter Diffraction (i.e., EBSD), Spatially Resolved Acoustic Spectroscopy (i.e. SRAS), Ultrasonic orientation characterization techniques, X-ray, or other approaches that measure physical properties of the sample material so as to infer or result in orientation state.

The orientation information obtained from the material sample is characterized in either sub-regions (i.e., "tiles") of a large area, or a large area is characterized and then split into tiles (i.e., sub-regions of the large area). Regardless, the orientation information is arranged into tiles that correspond to associated spatial locations of the sample. The tiles may contain information of one or more arbitrary dimensions (i.e. n-dimensions where n is any integer greater than 0). However, at least one of those dimensions should contain data about a location specific crystallographic orientation state (e.g. Euler angles, Rodrigues vector, Orientation matrix, etc). The collection of information about the orientation state at multiple locations is then regarded as the texture.

Texture processing is performed at 104. In this regard, the tile processing discussed above may be implemented as a separate process (such as may be implemented before texture processing) or the above-tile processing may be implemented as part of the texture processing at 104.

As noted above, each measurement (in whatever form is provided by the particular orientation measurement technology) is mapped to a corresponding orientation matrix. Thus, there is an orientation matrix for each pixel of each tile. For every tile, the Generalized Spherical Harmonic (GSH) expansion is computed from the corresponding orientation matrices, which transforms the measurements to an "orientation space". For instance, in an illustrative implementation, data from each tile is processed such that "texture information" along with non-texture information (e.g., information about the quality and pedigree of the corresponding data, etc.), form a hybrid descriptor that is able to discern, for instance, the relevance of a given data point in relation to belonging to a calculated zone of microtexture.

As an illustrative example, the orientation information may be extracted from the material sample at 102 using EBSD. The texture processing at 104 may then be performed by computing the Generalized Spherical Harmonic (GSH) expansion on the orientation information. Regardless of the means to collect the orientation information, texture processing at 104 comprises obtaining the symmetries as point-group operators, which are either given directly or solved for, for both the crystal symmetry and the sample symmetry. A computer algebra system (CAS) then solves for values (e.g., one per symmetry operator and rotational parameter) such that point-group operators can be applied through additive values to a given rotation to produce equivalent rotations with respect to the quotient space. The CAS then finds the linear combination of the additive values applied to the underlying basis function that produces the same values under all given symmetries. This linear combination of basis functions yields a closed form solution for a given bandwidth of the D-Wigner function.

Optimizations (e.g., constant folding and constant propagation) may then be performed by the CAS such that the number of operations required to evaluate the resulting closed form solution is minimized. Moreover, the resulting expression can be translated into program text for the target programming language (e.g., Fortran, Matlab, C, etc.). The generation of these computer codes represents a one-time cost; the generated computer code is used from that point forward to compute the compact representations of functions over the Special Orthogonal group SO(n).

The hybrid descriptors are inputted into a clustering device at 106. The clustering device outputs dominant zones of microtexture (also referred to herein as orientation clusters). In an illustrative implementation, a k-means clustering algorithm is used to find the most likely representative hybrid orientation descriptor such that the inner-class mean to the class centroids are minimized. However, in general, any methodology, algorithm, or combination of methodologies which provides a mapping from orientation descriptor to class label could be used in the place of the k-means clustering, which is discussed only as an example.

Additional cleanup may also be implemented, e.g., to remove regions which are identified as belonging to a macrozone, but yet are not on the required length scale. Cleanup may be implemented by mapping orientation clusters to real space at 108, performing spatial filtering at 110, performing macrozone identification at 112, or combinations thereof.

The orientation clusters are mapped to real space at 108. In an exemplary implementation, the dominant zones of microtexture output by the clustering device at 106 are spatially resolved at 108, back on to the original, corresponding spatial location in the sample. The orientation clusters are mapped back to the tiles and back to the original coordinate system from which they were collected.

Spatial filtering is performed at 110. Keeping with the above-exemplary implementation, local, spatial filtering is performed such that continuous regions of similar zones of microtexture are identified. Zones of microtexture are characterized by a representative orientation descriptor or collection of descriptors. In an illustrative implementation, data points that either do not belong to a coherent zone of microtexture or are of low quality are then labeled as outliers. In this instance a local voting scheme can be used to decide which zone of microtexture a given location belonged to in the case that there are multiple adjacent zones of microtexture.

A macrozone identification process can be performed at 112 to identify macrozones in the orientation descriptors. An example of identifying macrozones is set out in greater detail herein in the discussion of FIG. 4.

These representative orientation descriptors or collection of descriptors are used as input to microstructure metrics calculations. The microstructure metrics calculations can be utilized, for instance, to relate the characteristics of the zones of microtexture to performance parameters or processing paths.

Moreover, according to further aspects of the present disclosure, a graphical presentation of orientation information of multiple datasets is implemented by plotting Inverse pole figure (IPF) maps at 114. For instance, IPF maps can be generated for each individual dataset (i.e., tile). The images of the IPF maps can then be stitched into one image or multiple images.

Further, higher-order statistics can be processed at 116. In an illustrative example, macrozones identified at 112 are obtained and metrics on the macrozones are computed, including n-point statistics (e.g. 2-point statistics). The n-point statistics are applied to analyze the material under test. In this regard, the data can be expressed as a continuous function, i.e., a vector having a size the same as the image size. Thus, an m×m pixel image has an $m^2$ dimension space (also referred to herein generally as n-point). By way of illustration, and not by way of limitation, a 200×200 pixel image has 40,000 2-point statistics. By expanding out to a 40,000 dimension space, the image reduces to a single point. By obtaining a plurality of different data sets, each data set having the same dimensions (40,000 in this example), and by plotting each data set as a single point in space, trend analysis can be performed.

The overall texture of the sample is then partitioned into the orientation descriptors that comprise each zone of microtexture at 118. This allows an investigator to compute or derive information on regions of microtexture that they would normally perform on the level of the whole sample. In the case of EBSD, an exemplary but not limiting case would be computing texture distributions (e.g., pole figures or orientation distribution functions (ODF)).

According to still further aspects of the present disclosure, the obtained data, including the microstructure metrics, n-point information, etc., are stored in a long-term data storage and archival system for subsequent use at 120. The stored information can be retrieved for performing quality control at 122. For instance, microstructure metrics can be retrieved from storage for comparison across different data sets and samples. This allows, as an example, an engineer to make decisions about quality control of thermo-mechanical processing.

As another example, the data stored in the database at 120 can be evaluated for various data mining operations at 124. More particularly, according to still further aspects of the present invention, n-point information is stored, mapped, processed, searched and/or otherwise manipulated to perform analysis of orientation information. As an illustrative example, EBSD is utilized to calculate the crystallographic orientations of crystalline materials, e.g., to study materials with ordered crystal structure, such as titanium. Based upon the collected information, orientation data is extracted and n-point correlations (n=2,3,4 etc.) are then used to analyze the linkages of the microstructure to the properties of the material.

According to yet a further aspect of the present disclosure, n-point correlations are used to define a common language for analyzing materials. In this regard, the n-point correlations can serve as a "barcode" to embed metadata that can be later recovered to identify information about the sample under evaluation, e.g., to embed information such as a source of the material, date of test, batch identifier, location or any other useful information.

Figure 2A:
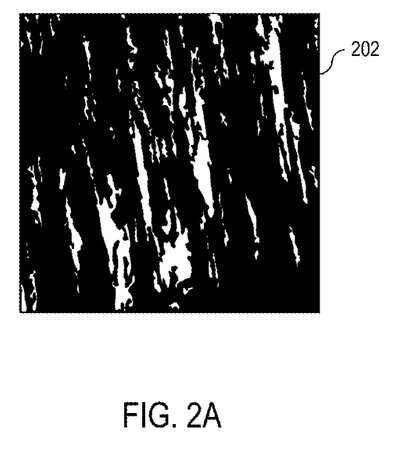
FIG. 2A is an exemplary illustration of a first segmented macrozone, according to aspects of the present disclosure.
Figure 2B:
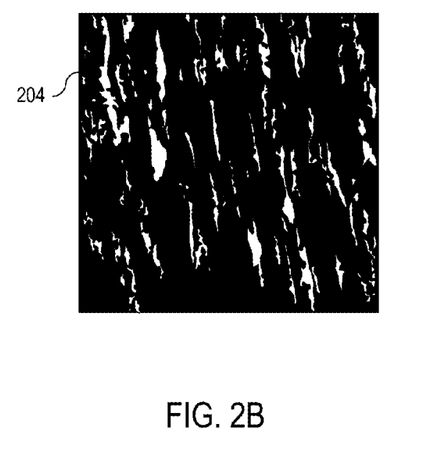
FIG. 2B is an exemplary illustration of a second segmented macrozone, according to aspects of the present disclosure.
Figure 2C:
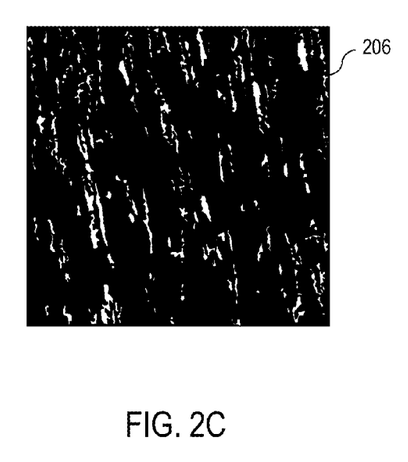
FIG. 2C is an exemplary illustration of a third segmented macrozone, according to aspects of the present disclosure.
Figure 2D:
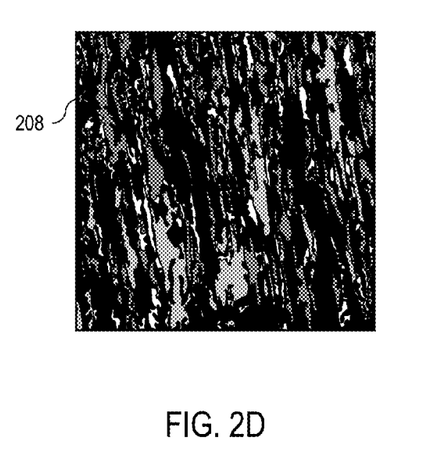
FIG. 2D is an exemplary illustration of a C-Map stitched from individual tiles, according to aspects of the present disclosure.

As an illustrative, but not limiting example, reference is made to FIGS. 2A-2D. In this example, the c-axis (e.g. [0001] is the direction normal to the basal plane in the hcp titanium) is used as the primary orientation descriptor and the direction of the c-axis is mapped on to a color using a stereographic projection. Three illustrative individual zones of microtexture are identified using the above methods and are segmented into the images seen in FIGS. 2A, 2B and 2C, respectively. More particularly, an exemplary first segmented macrozone 202 is illustrated in FIG. 2A. An exemplary second segmented macrozone 204 is illustrated in FIG. 2B. An exemplary third segmented macrozone 206 is illustrated in FIG. 2C. FIG. 2D illustrates a c-axis map (herein is referred to it as C-Map) 208 that has been stitched together from corresponding tiles, as described more fully herein. Similarly, C-Maps can be plotted for the clustered C-coefficients of the GSH in 108 above.

Orientation Information

Figure 3:
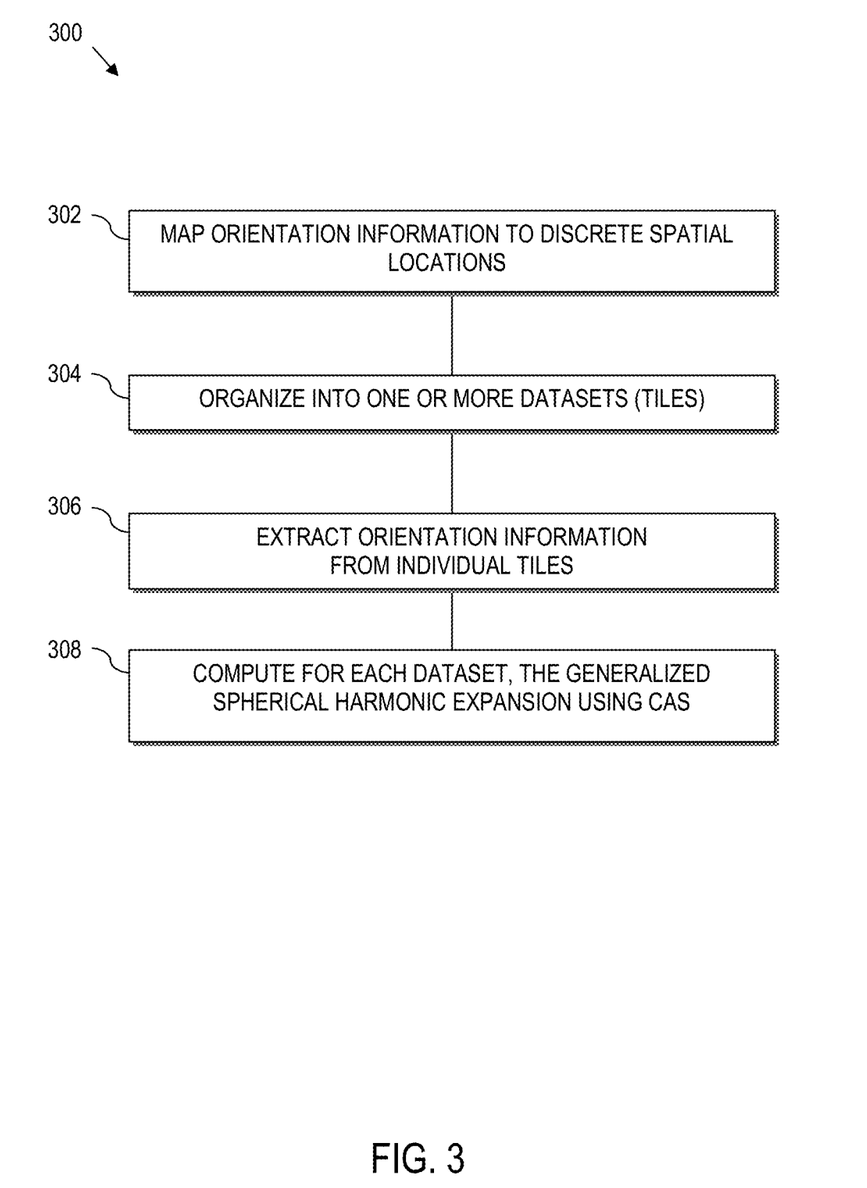
FIG. 3 is a method to process orientation information of a material sample, according to various aspects of the present disclosure.

Referring to FIG. 3, a method 300 is illustrated to process orientation information. The method 300 may be utilized, for instance, to perform texture processing at 104 and/or other processing of the orientation information collected at 102 of FIG. 1. According to various aspects of the present disclosure, starting data of orientation information is mapped at 302 to discrete spatial locations. The starting data of orientation information is organized at 304. For instance, the orientation information can be arranged in one dataset or multiple datasets (i.e., tiles). For each individual dataset (tile), each spatial location may contain the crystallographic orientation, local chemistry, phase, or any other information collected or added during or after data collection. In a non-limiting but illustrative example, a sample may produce 1,000 tiles, each tile containing data for 1,000,000 spatial points or more. Moreover, each data point may contain multiple individual pieces of information, e.g., 10-20 pieces of information.

Orientation information is extracted at 306, e.g., for each location, i.e., from individual tiles. Thus, the process works on tiles individually, thus providing a computationally efficient process compared to processing all orientation information measurements as a single, large dataset. In an exemplary implementation, a view of the orientation of the crystal structure is defined. For instance, a sample material can be probed to see the orientation of grains. By knowing grain orientation in space, one can get a sense of the material and look at its "texture", i.e., preferred orientation. An approach to look at texture is to consider the average of the orientation of crystals in space. Thus, in an illustrative implementation, Euler angles are used to determine orientation, and thus "texture" information. In the case of EBSD data, an orientation distribution function (ODF) is determined. The ODF is a continuous function that represents texture.

According to further aspects of the present disclosure, in an exemplary case of EBSD texture information, a graphical representation of orientation information of multiple datasets is accomplished by plotting an Inverse Pole Figure (IPF) map for each individual dataset (tile). The resultant IPF image maps (metadata) are stitched into one image or multiple images. This method enables the analysis of large datasets in a short computational timeframe.

For instance, by taking a plurality of EBSD scans, e.g., 1,000 or more scans, and stitching the image data together (not the underlying data), a dataset is provided that allows computationally efficient zooming in and out of the data to expedite data analysis. In this regard, by stitching tiles together, granularity can be coarsened to large scale or focused to small scale by zooming in on the image data without the computational burden of the underlying data. That is, the image data is stitched, not the underlying data. This produces an efficient way to manage data. In the case where data was collected as a single region, the single region can be efficiently dealt with in an analogous manner, e.g., by dividing the single region into regular sub-regions (tiles) and applying the above-described technique.

A harmonic function is used to capture grain orientations at 308, e.g., in the case of EBSD data, by way of illustration and not by way of limitation. Other functional representations can be used for other cases up to and including the use of primitive basis functions. In an illustrative implementation, for each dataset, the generalized spherical harmonic (GSH) expansion of each crystallographic orientation is computed. Notably, conventional processing can take a considerable amount of time, even to process a single tile. However, according to aspects of the present disclosure, numerical interpolation is used to capture generalized spherical harmonic coefficients. By way of illustration and not by way of limitation, a database is constructed of all textures. A numerical analysis is used to calculate the GSH coefficients of the textures captured in the database. This numerical approach can speed up processing significantly over a process that computes the GSH per tile.

According to further aspects of the present disclosure, texture information for the overall dataset or subsets can be calculated directly by plotting standard Pole figure or Orientation Distribution Functions from the Generalized Spherical Harmonics.

As another illustrative example, the GSH can be computed using closed-form analytical solutions, for the basis function of a limited bandwidth as computed by a CAS (Computer Algebra System), examples of which are described above with reference to FIG. 1. Moreover, each expansion is optimized to reduce the number of expressions evaluated. Expansion optimization is carried out in one illustrative exemplary implementation by using compiler-like optimization techniques. In an exemplary implementation, as a result of the technique set out above, an order of magnitude savings was observed in the CPU time (i.e., time for which a central processing unit was used) that was required to compute the basis functions of an arbitrary orientation compared to computing these basis functions using an intermediate Fourier basis.

Figure 4:
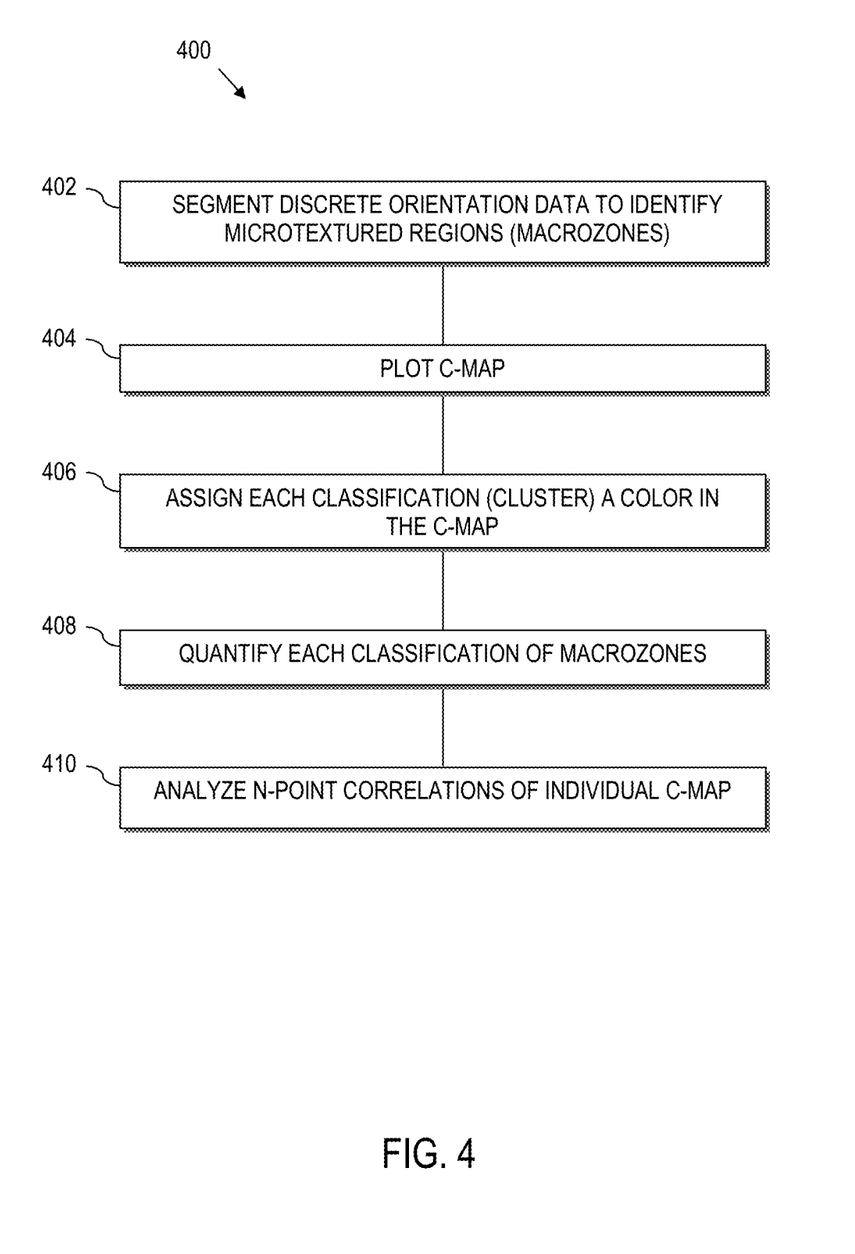
FIG. 4 is a method to identify microtextured regions (i.e., macrozones), according to various aspects of the present disclosure.

Referring to FIG. 4, a method 400 is provided to identify microtextured regions (macrozones). This process may be utilized for instance, to implement the macrozone identification 112 of FIG. 1. Discrete orientation data, e.g., the output of the method 300, is segmented at 402. As an example, discrete orientation data from EBSD is segmented into different classifications by using an algorithm which assigns a classification based error-minimization with respect to a parametric probability distribution. In addition to the discrete orientation data, information about the reliability (or quality) of the extracted orientation data and the accuracy (or confidence) of indexing them is taken into account in the classification algorithm, and data points which are below a preset threshold are excluded in the classification process.

The graphical presentation of segmented microtextured regions (macrozones) is accomplished, for instance, by plotting the C-Map at 404. In an illustrative implementation, the C-Map is plotted in which the square of cosine angles between the crystallographic crystal direction of interest (e.g., basal pole for hcp titanium) and the sample coordinate axes (e.g. reference direction (RD), transverse direction (TD), and normal direction (ND)) is plotted.

Each classification (cluster) is assigned a code, e.g., a color, in the C-Map at 406. Thus, the C-Map is color-coded. For instance, in an illustrative implementation, for visual identification of individual macrozones that were segmented, each classification (cluster) is assigned a color (or fill, pattern or other distinguishable characteristic) at 406 in the C-Map. The coloring of the C-Map may be associated to a key color map with continuous gradient of colors for each possible value of cosine squares (0-1). As such, the color coding is based upon orientation information.

As noted above, higher-order statistics, (e.g., 116 of FIG. 1), may be performed. For instance, each classification of macrozones is quantified at 408. To quantify each classification of macrozones at 408, C-Maps for each classification of macrozone are plotted. From the C-Maps of each classification, the n-point statistics are calculated and the chord-length distributions are calculated. Building a database of various datasets collected from various samples, the n-point correlations of individual C-Maps (or any other segmented data) are analyzed via data mining procedures at 410.

In an exemplary implementation, the n-point correlations of individual C-Maps (or any other segmented data) are analyzed using Principal Component Analysis (PCA). Various datasets from various samples with statistically related features clusters in PCA space. In general, this technique can be used with any clustering analysis algorithm (e.g., Support vector machines (SVM), Independent component analysis, or Manifold learning, etc).

The above technique can be used as a quality control database (e.g., to perform quality control 122 of FIG. 1). As an illustrative example, in the identification of titanium alloys produced by various processing methodologies, the distance in PCA space between a given sample and a preselected standard sample can establish how similar the processing history and performance are between the given sample and the standard sample.

Figure 5:
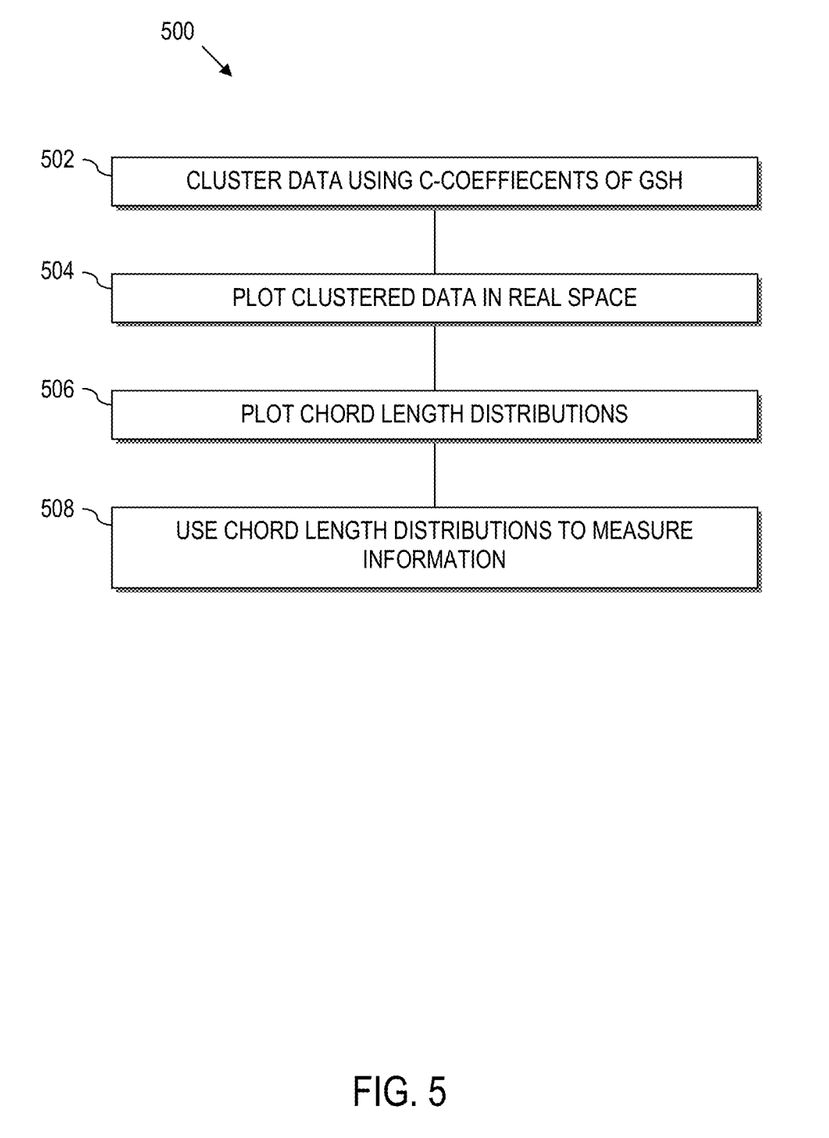
FIG. 5 is a method of using the C-coefficients of a Generalized Spherical Harmonic (GSH) expansion to measure macrozone metrics.

Referring to FIG. 5, a method 500 is provided, according to various aspects of the present disclosure, to use the C-coefficients of the GSH to provide insight into the material under analysis. In an illustrative implementation, the data is clustered at 502 around the C-coefficients to define a new mapping. By clustering in the C-space, the user looks at clustering along an axis of interest. By plotting clustered data in real space (e.g., the sample surface) at 504, various metrics can be extracted from clustered regions, e.g., by plotting chord-length distributions at 506 along all possible sample directions. The general idea is that the chords should lie inside the clustered region and touching the boundaries. Chord-length distribution is then used to measure information about the dimensions of clusters in the C-Maps at 508, e.g., to determine aspect ratio, spatial separation, size etc. Notably, chord-length distribution is possible in a single sample direction and/or all possible sample directions in 360 degrees.

For example, when analyzing a titanium microstructure with macrozones, a user may be interested in the c-axes of the crystal structure of the titanium sample. As such the data is clustered in the C-space of the GSH and the data is then mapped into the real space (e.g., sample coordinates). Based upon these clusters, an n-point (n=2, 3, etc) correlation is then performed on the identified clusters (macrozones). For example, the 2-point statistics are used to analyze the image and find the probability of a vector head and tail to fall on the same feature (i.e. macrozone).

According to various aspects of the present disclosure, machine learning is used to identify features of interest in the sample of interest, e.g., the sample of titanium. In this regard, features may not consistently be in the same place within a pattern, have the same shape or same orientation, even across different locations of the same sample material.

As yet another illustrative example, the n-point correlations are analyzed using Principal Component Analysis (PCA). For instance, using Principle Component Analysis, the direction of the most scattering of the data is defined as the first principle direction. The direction orthogonal to the first principle direction defines a second principle direction, and a third principle direction is orthogonal to the first and second principle directions. Various datasets from various samples with statistically related features cluster in PCA space. For example, the gray hull in FIG. 7. As yet another illustrative example, the n-point correlations are analyzed using Independent Component Analysis (ICA) space. As yet further examples, manifold learning can be used for data reduction, e.g., to facilitate more efficient data mining.

EXAMPLE

Figure 6:
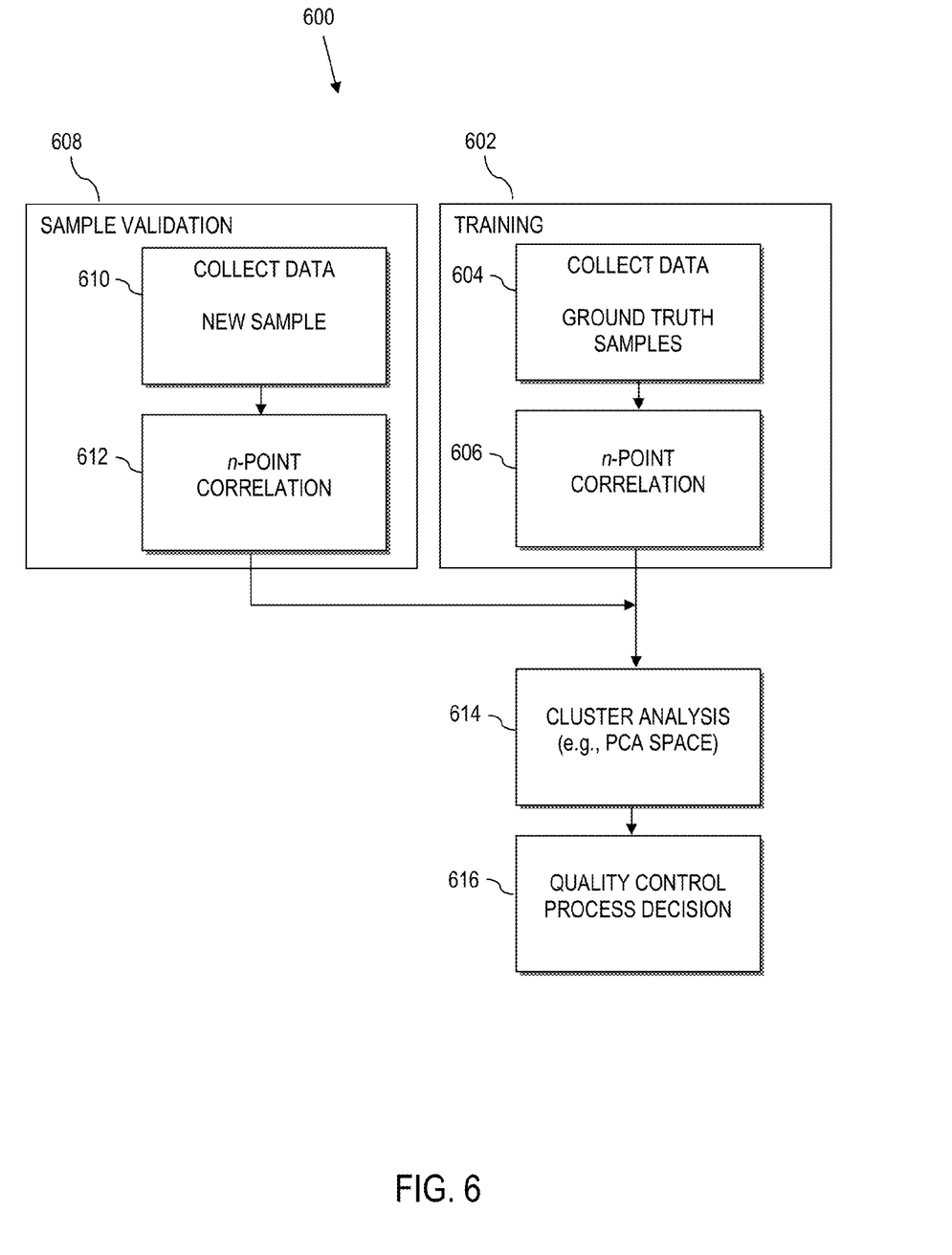
FIG. 6 is a method of distinguishing material that is conforming, e.g., to a standard specification, compared to non-conforming materials, according to various aspects of the present disclosure.

Referring to FIG. 6, a method 600 is illustrated to identify material that is conforming to preselected standard procedure(s) (e.g. thermo-mechanical processing) vs. materials that do not conform to the standard procedures. The method 600 comprises implementing a training process at 602 that includes collecting a plurality of datasets (e.g., EBSD datasets) at 604 that are from known conforming materials. All datasets are analyzed per the procedures mentioned above and explained with reference to FIGS. 1-5, including the computation of n-point correlations at 606. The method 600 further comprises implementing a sample validation process at 608. The sample validation process 608 comprises collecting a dataset from a new sample at 610 and analyzing the new dataset per the procedures mentioned above and explained with reference to FIGS. 1-5, including the computation of n-point correlations at 612.

Figure 7:
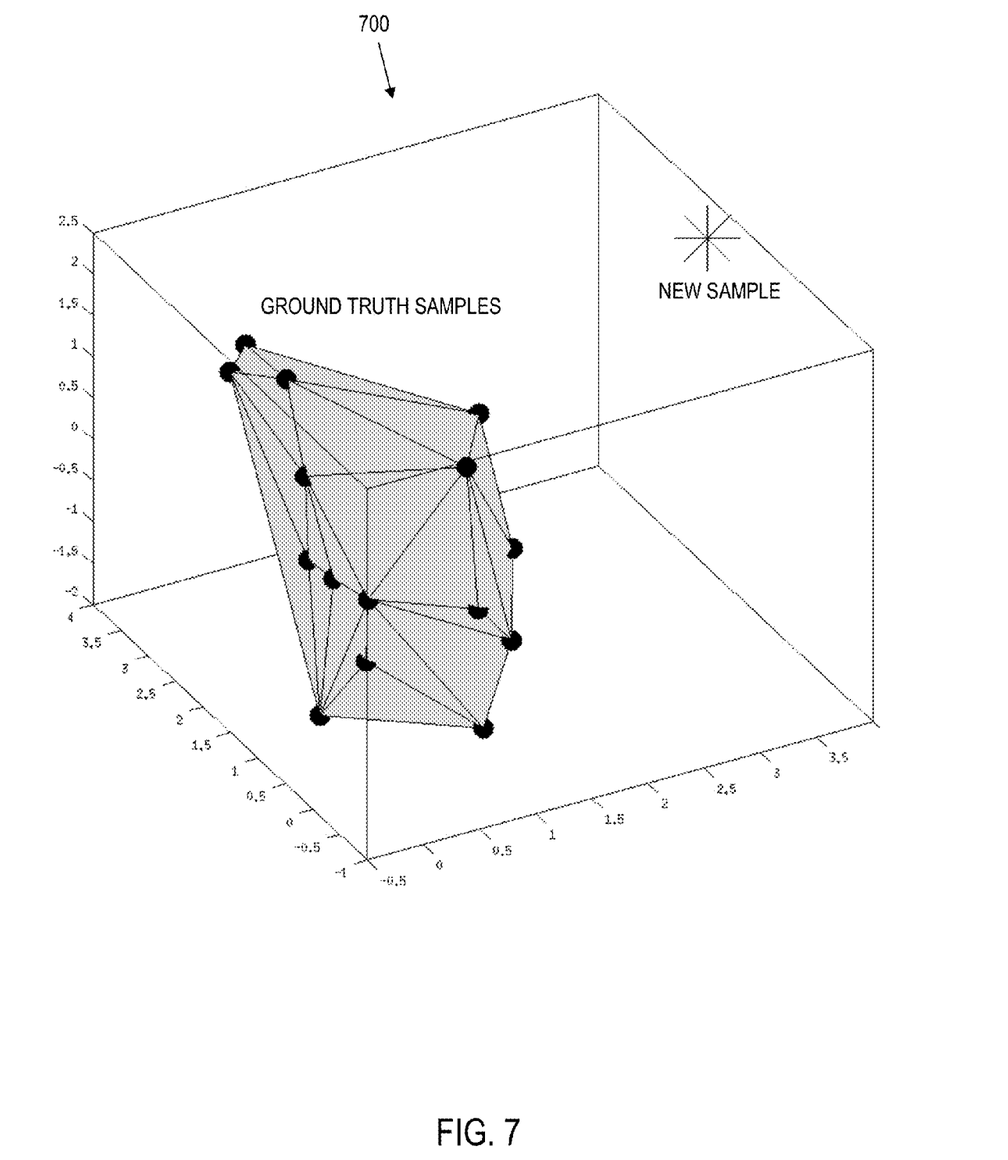
FIG. 7 is an exemplary illustration of using cluster analysis of orientation descriptors in the process of quality control.

Cluster analysis is then used to look at all datasets at 614. For instance, the method 600 may comprise calculating the 2-point correlations at 606 and 612 of the microstructure features (e.g. macrozones) in the datasets collected at 604 and 610, and by plotting the 2-point statistics as a single point in the PCA space at 614. Based upon an identification of where the sample under investigation, 610, lies in the PCA space relative to the defined requirements, e.g., known conforming points, observations and predictions can be drawn at 616 about whether the sample under investigation is conforming or non-conforming. FIG. 7 shows an example of how this process is used for a quality control application.

Notably, in illustrative implementations, there is no need to manually identify bounds on conforming or non-conforming determinations. In PCA space, all datasets that belong to conforming material happen to cluster together. As such, anything within the cluster will be conforming. All datasets that do not conform to standards do not fall within the conforming hull of the cluster. As such, anything outside the conforming hull (cluster) will be non-conforming. This allows an automatic process to perform the evaluation.

For instance, referring to FIG. 7, for exemplary datasets, the 2-point correlations of the macrozones from multiple ground truth samples are shown in PCA space. The solid circles represent ground truth samples that fall within a conforming material hull. Additionally, the 2-point correlations of macrozones of the test sample are shown in PCA space, which is illustrated by an asterisk. Note that, in this illustrative example, the data for the new sample falls outside the ground truth sample (i.e. confirming material to preset standard) and is thus non-conforming material because the new sample is outside the hull.

Thus, the 2-point correlation of various microstructural features in the PCA space can be used to distinguish conforming vs. nonconforming titanium. By collecting a plurality of datasets that are from known conforming titanium batch, PCA analysis can be used to look at an unknown sample by calculating the 2-point statistic of a microstructure feature (e.g. macrozones) in the sample dataset, and by plotting the 2-point statistics as a single point in the PCA space. Based upon an identification of where the sample under investigation lies in the PCA space relative to the known conforming points and hull, observations and predictions can be drawn about whether the sample under investigation is conforming or non-conforming titanium.

In yet another illustrative example, assume that a task is to establish an automatic method for differentiating between billet and plate titanium. The methods set out herein are used to quantify various features and establish statistical correlations that enable software to automatically predict whether a sample of titanium belongs to a billet or a plate processed titanium.

Both morphological and crystallographical heterogeneities across multiple length scales may need to be considered during identifying and quantifying macrozones.

Using electron backscatter diffraction (EBSD), scans of large areas are necessary to capture macro-heterogeneities while high resolution is necessary for capturing micro-heterogeneities. However, according to aspects of the present disclosure, EBSD data (or orientation information collected using other suitable techniques) is recorded from various locations of alpha/beta titanium material. For instance, EBSD data is collected in individual tiles, e.g., (600-1000 each 300× 300 μm at 1-μm step size).

The above-described methods are used to analyze each individual tile and construct large representations of the metadata (metacontent). An exemplary implementation is summarized below:

1. Orientation information is extracted, such as IPF maps, texture (Pole figures and ODF), chemistry, etc.
2. The Generalized Spherical Harmonics (GSH) is calculated.
3. The GSH coefficients are projected in C-space.
4. The C-coefficients associated with basal planes are identified.
5. C-coefficients within a selected tolerance are classified and clustered.
6. The classification is mapped to real space.
7. C-Maps of the direction cosines of c-axes are plotted at every pixel.
8. Macrozones are identified based on the classification in C-space and the spatial correlation in real space.
9. 2-point statistics and Chord Length Distributions (CLD) are calculated.
10. The 2-point correlations are projected in PCA space.
11. Clustered data in PCA space is classified for quality control.

Aspects of the present disclosure, including any one or more of the methods set out above, may be embodied as a system, method or computer program product. Accordingly, aspects of the present disclosure may take the form of an entirely hardware embodiment, an entirely software embodiment. Furthermore, aspects of the present disclosure may take the form of a computer program product (computer code) embodied in one or more tangible, non-transitory computer-readable storage mediums. The computer program product is executed by a processing device such as a desktop computer, laptop computer or other device that is capable of executing software instructions, to perform one or more of the specified methods herein.

In the context of this document, a computer readable storage medium may be any tangible storage device that can contain, represent or otherwise store a program for use by or in connection with an instruction execution system, apparatus, or device, e.g., a portable physical storage device, a hard disk, a random access memory (RAM), a read-only memory (ROM), an erasable programmable read-only memory (EPROM), Flash memory, a portable compact disc read-only memory (CD-ROM) or any suitable combination of the foregoing.

Aspects of the present disclosure are described herein with reference to flowchart illustrations and/or block diagrams according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Aspects of the disclosure were chosen and described in order to best explain the principles of the disclosure and the practical application, and to enable others of ordinary skill in the art to understand the disclosure for various embodiments with various modifications as are suited to the particular use contemplated.

What is claimed is:

1. A method of analyzing microtextured regions in materials with ordered crystal structure, comprising:
    obtaining crystallographic orientation information from a sample of a material under evaluation, the obtained orientation information mapped to discrete spatial locations of the sample;
    performing texture processing of the obtained orientation information by generating hybrid descriptors, and by transforming the obtained orientation information to an orientation space using the hybrid descriptors, each hybrid descriptor comprising texture information and non-texture information extracted from associated orientation information;
    clustering the hybrid descriptors in the orientation space to produce orientation clusters where each orientation cluster corresponds to a dominant zone of microtexture;
    generating composite data by spatially resolving the orientation clusters back to corresponding spatial locations in the sample; and
    performing a local spatial filtering of the composite data such that continuous regions of similar zones of microtexture are identified in the filtered composite data.

2. The method of claim 1, wherein obtaining crystallographic orientation information further comprises:
    arranging the extracted orientation information into tiles such that the tiles correspond to associated spatial locations of the sample.

3. The method of claim 2, wherein:
    arranging the extracted orientation information comprises arranging the extracted orientation information within each tile to contain information of arbitrary dimensions such that at least one dimension contains data about a local crystallographic orientation state; and
    performing texture processing comprises processing the collected information from individual tiles.

4. The method of claim 1, wherein obtaining crystallographic orientation information comprises:
    using an orientation measurement device that collects the orientation information from the sample by converting measured physical material responses to crystallographic orientations using at least one of Electron Backscatter Diffraction, Spatially Resolved Acoustic Spectroscopy, and X-ray Laue technique.

5. The method of claim 4, wherein performing texture processing of the collected orientation information comprises:
    computing the Generalized Spherical Harmonic expansion on the orientation information.

6. The method of claim 5, wherein computing the Generalized Spherical Harmonic comprises:
    constructing a database of textures; and
    using numerical interpolation to capture generalized spherical harmonic coefficients based upon the textures in the database.

7. The method of claim 4, wherein performing texture processing of the collected orientation information comprises:
    determining an orientation distribution function as a continuous function that represents texture.

8. The method of claim 4, wherein:
    obtaining crystallographic orientation information further comprises:
        arranging the extracted orientation information into tiles such that the tiles correspond to associated spatial locations of the sample; and performing texture processing of the collected orientation information comprises:
  determining texture based upon the average of the orientation of crystals in space;
  plotting an Inverse Pole Figure map for each individual tile; and
  stitching the resultant images of Inverse Pole Figure maps into at least one image.

9. The method of claim 1, wherein performing texture processing of the collected orientation information comprises:
  utilizing at least one of Euler angles, an orientation matrix and orientation descriptor to determine texture information of the orientation from the orientation information where the texture information corresponds to a preferred orientation based upon how many crystals are oriented in the same direction.

10. The method of claim 1, wherein performing texture processing comprises:
  obtaining symmetries as point-group operators;
  applying point-group operators through additive values to a given rotation to produce equivalent rotations with respect to the quotient space; and
  finding the linear combination of the additive values applied to the underlying basis function that produces the same values under all given symmetries, such that the linear combination of basis functions yields a closed form solution for a given bandwidth of the D-Wigner function.

11. The method of claim 1, wherein clustering the hybrid descriptors to produce orientation clusters comprises:
  implementing a k-means clustering algorithm to find the most likely representative hybrid orientation descriptor such that the inner-class mean to the class centroids are minimized.

12. The method of claim 1, wherein performing a local spatial filtering of the composite data comprises:
  identifying continuous regions of similar zones of microtexture by characterizing zones of microtexture by at least one representative orientation descriptor.

13. The method of claim 1, wherein performing a local spatial filtering of the composite data comprises:
  identifying data points as outliers that either do not belong to a coherent zone of microtexture or are of low quality using a local voting scheme to decide which zone of microtexture a given location belongs to in the case that there are multiple adjacent zones of microtexture.

14. The method of claim 1 further comprising:
  identifying macrozones;
  computing n-point correlations on the identified macrozones; and
  using n-point correlations to define a common language for analyzing multiple different materials.

15. The method of claim 14 further comprising:
  using the n-point correlation to embed metadata that can be later recovered to identify information about the sample under evaluation.

16. The method of claim 1 further comprising:
  identifying microtextured regions in the collected data by:
    obtaining discrete orientation data extracted from the orientation information; and
    segmenting the discrete orientation data into clusters;
  graphically presenting segmented microtextured regions by:
    plotting a C-Map; and
    assigning each cluster to a unique color such that the colors correspond with orientation information;
  calculating n-point correlations for the C-Map; and
  calculating the chord-length distributions for the C-Map.

17. The method of claim 1 further comprising:
  identifying microtextured regions in the collected data by:
    obtaining discrete orientation data extracted from the orientation information; and
    segmenting the discrete orientation data into clusters;
  calculating n-point correlations on the segmented clusters;
  using Principal Component Analysis to analyze the n-point statistics against other previously collected datasets to identify statistically related features that clusters in Principal Component Analysis (PCA) space.

18. The method of claim 17 further comprising:
  comparing the distance in PCA space between the sample under evaluation and a preselected standard sample to establish how similar the processing history and performance are between the sample under evaluation and the standard sample.

19. The method of claim 18 further comprising:
  distinguishing between conforming and nonconforming material based upon the comparison of distance in PCA space.

20. A method of analyzing microtextured regions in materials with ordered crystal structure, comprising:
  obtaining crystallographic orientation information from a sample of a material under evaluation;
  performing texture processing of the collected orientation information by generating hybrid descriptors, each hybrid descriptor comprising texture information and non-texture information extracted from associated orientation information:
  wherein performing texture processing of the collected orientation information comprises:
    computing the Generalized Spherical Harmonic expansion on the orientation information;
  further comprising:
    clustering C-coefficients from the Generalized Spherical Harmonic expansion to define a new mapping;
    plotting clustered data in real space;
    plotting chord-length distributions along sample directions of interest;
    using the chord-length distributions to measure information about the dimensions of clusters in the C-Maps; and
    using 2-point correlations to analyze the mapping and find the probability of a vector head and tail to fall on the same feature;
  clustering the hybrid descriptors to produce orientation clusters where each orientation cluster corresponds to a dominant zone of microtexture;
  generating composite data by spatially resolving the orientation clusters to real space; and
  performing a local satial filtering of the com osite data such that continuous regions of similar zones of microtexture are identified in the filtered composite data.

21. The method of claim 1, wherein obtaining crystallographic orientation information comprises:
  collecting orientation information using at least one orientation measurement device so as to infer orientation state.

* * * * *

UNITED STATES PATENT AND TRADEMARK OFFICE
CERTIFICATE OF CORRECTION

PATENT NO. : 9,070,203 B2  
APPLICATION NO. : 13/761912  
DATED : June 30, 2015  
INVENTOR(S) : Ayman A. Salem et al.

It is certified that error appears in the above-identified patent and that said Letters Patent is hereby corrected as shown below:

In the claims,

Column 14, line 54, "a local s atial filtering of the com osite data" should read --a local spatial filtering of the composite data--.

Signed and Sealed this  
Fifteenth Day of March, 2016

Michelle K. Lee  
*Director of the United States Patent and Trademark Office*